Figure 1:
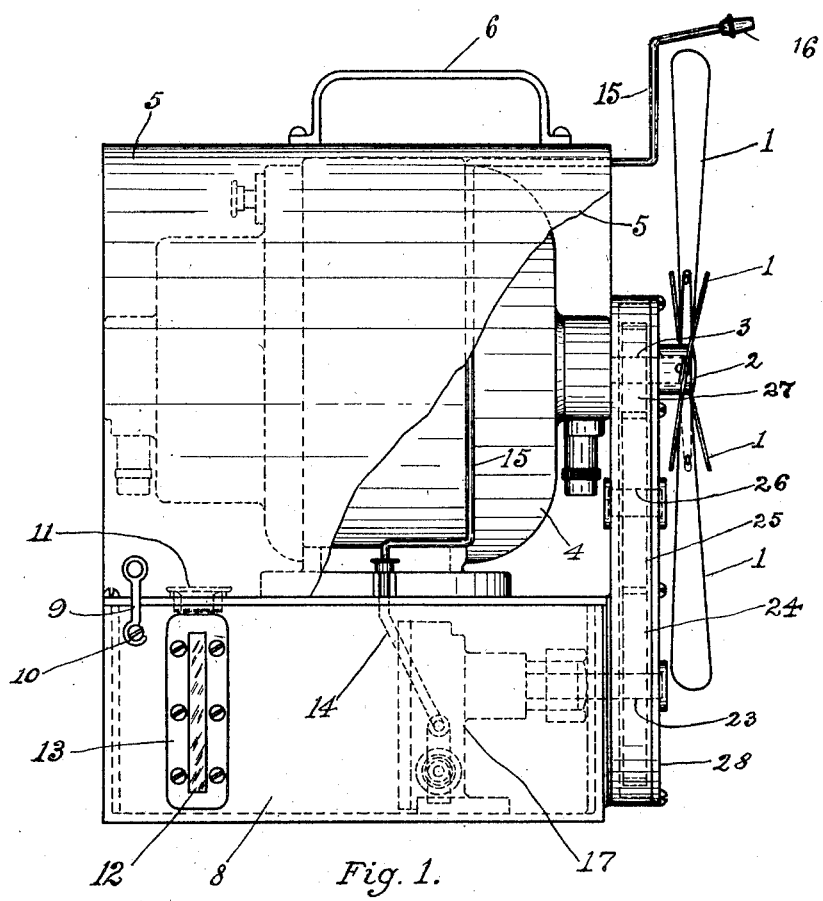

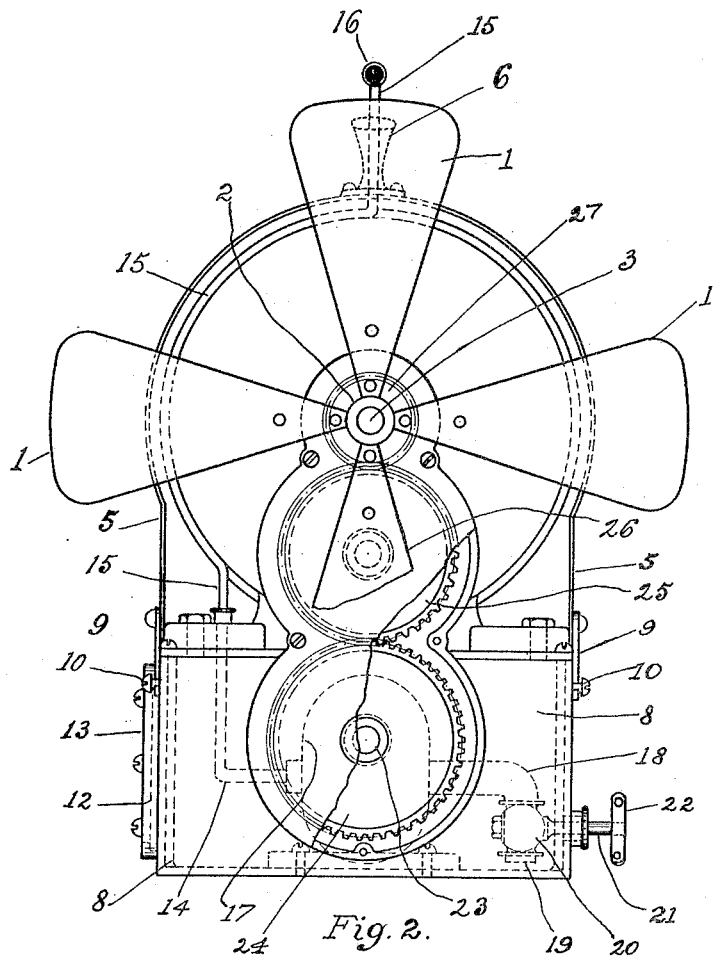

UNITED STATES PATENT OFFICE.

JOSEPH I. KOPPERL, OF CHICAGO, ILLINOIS, ASSIGNOR OF ONE-HALF TO CHARLES F. EIKER, OF CHICAGO, ILLINOIS.

ATOMIZING-FAN OR THE LIKE.

1,116,443.  Specification of Letters Patent.  Patented Nov. 10, 1914.

Application filed January 15, 1912. Serial No. 671,349.

*To all whom it may concern:*

Be it known that I, JOSEPH I. KOPPERL, a citizen of the United States, residing at Chicago, in the county of Cook and State of Illinois, have invented certain new and useful Improvements in Atomizing-Fans or the like, of which the following is a description.

My invention belongs to those general classes of devices known as fans and atomizers, and relates particularly to a combined fan and atomizer, or atomizing fan.

The device is intended and designed to thoroughly stir or circulate the air in a room, or in its vicinity, and combine moisture with it, and, if desired, to perfume or disinfect the same and the surrounding objects.

My invention has among its objects the production of a device of the kind described that is simple, convenient, efficient, durable and satisfactory, and which may be used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of my improved device, a portion broken away to show the construction, and Fig. 2 is a front elevation of the same, a portion broken away to show the construction.

Referring to the drawing, 1, 1, etc., represent the blades of the fan, arranged on a suitable hub 2, mounted on the shaft 3. The shaft 3 may be driven in any suitable manner, preferably by an electric motor 4, arranged within a suitable casing 5. Where the device is made of such size as to be portable, the casing 5 may be provided with a handle 6, or its equivalent, for convenience in carrying about. Arranged proximate the casing 5, and preferably below the same, as shown, is a suitable container or receptacle 8, the same being secured to the casing 5 by hooks 9 on one part engaging the screws 10 on the other part, or their equivalents for the purpose. The receptacle 8 is provided with a suitable filling inlet 11, at which may be placed a fine mesh screen or strainer (not shown) and is also provided with a suitable sight opening covered by glass 12, or its equivalent, mounted in a suitable frame 13 secured to the casing 8. The glass and frame 13 are so secured that the contents of the receptacle cannot leak out.

Extending from the interior of the receptacle 8 is a pipe 14, to which is connected a pipe 15, which is extended upwardly to above and slightly in front of the fan, and provided with a suitable nozzle 16. I do not wish to be understood as limiting the position of the nozzle, however, to above and before the fan blades 1, as the same may be arranged wherever found desirable. Arranged within the receptacle 8 is suitable pumping means, as shown, a small circulating pump, the same being contained in the casing 17. I have not considered it necessary to show the pump in detail, as any suitable pumping means, or the equivalent, may be employed, the same preferably consisting of a casing and small gears arranged within the same, the casing being provided with an inlet and outlet. The pipe 14 is connected to the pump casing outlet. To the inlet of the casing 17 is connected a pipe 18, which is preferably extended downward, as at 19, to proximate the bottom of the receptacle, the passage of the fluid through the pipes 19 and 18 being controlled by a valve arranged in the valve casing 20. The valve may be of any suitable type, and as shown, a stem 21 controls the valve, 22 being an arm, to which chains or cords may be attached, for operating the valve when the device is positioned or set up at a point where it is inconvenient to operate the stem 21.

The pump may be driven in any suitable manner, the pump in the casing 17 shown in the drawings is driven by a shaft 23, which extends to without the casing or receptacle 8. On the exterior of the casings 5 and 8, is arranged a gear casing 28. Within the gear casing 28 is arranged a gear 24 secured to the shaft 23, which meshes with an idler or gear 25, arranged on a shaft 26, which last mentioned gear meshes with the pinion or gear 27 secured to the shaft 3. As the fan is driven by the motor 4, the circulating pump is driven through the gears 27, 25 and 24.

Any suitable fluid may be put in the receptacle 8, as, for instance, water, oil, perfume, disinfectant, or the like, or a mixture of any two or more of them. As the circulating pump is driven, the fluid is forced up through the pipes 14 and 15 and out through the nozzle 16, in the form of a very fine spray, which is diffused about the room by the drafts of air from the fan 1. Where water is used, the air in the room is given moisture, and, in the case of perfume, or disinfectant, the same is carried about the room to every corner. Where a combination of fluids are vaporized and discharged in front of the fan, the air is made moist, and may be perfumed and disinfected at the same time. The fan performs its usual function of creating a draft or breeze and stirring up the air at the same time, and there is no additional expense for power, as the fan and spraying apparatus are operated from the same motor.

Having thus described my invention, it is obvious that various immaterial modifications may be made in the same without departing from the spirit of my invention, hence I do not wish to be understood as limiting myself to the exact form, construction, arrangement or combination of parts herein shown and described, or uses mentioned.

What I claim as new and desire to secure by Letters Patent is:—

1. In a device of the character described, the combination of a horizontally disposed closed casing adapted to contain water or the like, a motor positioned on the top wall of the casing having a horizontally disposed shaft, a fan positioned on said shaft, a pump within the casing, a conduit leading from said pump and connecting with a nozzle having an outlet adjacent the periphery of the fan at the top thereof, a pump shaft projecting to the front of the casing, and a driving connection between the motor shaft and the pump shaft.

2. In a device of the character described, the combination of a horizontally disposed closed casing adapted to contain water or the like, a motor positioned on the top wall of the casing, having a horizontally disposed shaft, a fan positioned on said shaft, a pump within the casing, a conduit leading from said pump and connecting with a nozzle having an outlet adjacent the periphery of the fan at the top thereof, a pump shaft projecting to the front of the casing, an auxiliary vertically disposed casing, a gear wheel carried by the pump shaft, an auxiliary gear wheel supported on the auxiliary casing and arranged to mesh with the first mentioned gear wheel, and a pinion on the motor shaft in mesh with the auxiliary gear wheel, said gear wheels and pinion being positioned within the auxiliary casing.

3. A portable device of the character described comprising a receptacle adapted to contain water and having closed walls, a motor positioned on the top wall of the receptacle, a housing for the motor, means carried by the housing and adapted to engage the side wall of the water receptacle to removably support the housing in position, a handle secured to the top of the housing, a fan arranged at the front of the housing carried by the motor shaft, a pump positioned in the receptacle and having a shaft projecting through the front wall of the receptacle, a gear connection between the two shafts, and a conduit leading from the pump to a point adjacent the periphery of the fan and having a discharge nozzle at this point.

In testimony whereof, I have hereunto signed by name in the presence of two subscribing witnesses.

JOSEPH I. KOPPERL.

Witnesses:
Roy W. Hill,
John W. Hill.

Copies of this patent may be obtained for five cents each, by addressing the "Commissioner of Patents, Washington, D. C."